United States Patent
Yoshida et al.

(10) Patent No.: US 10,938,283 B2
(45) Date of Patent: Mar. 2, 2021

(54) ASSEMBLING DEVICE AND METHOD

(71) Applicant: HONDA MOTOR CO., LTD., Tokyo (JP)

(72) Inventors: Takashi Yoshida, Tochigi (JP); Shuhei Okuda, Tochigi (JP); Takumi Fukaura, Tochigi (JP); Hiroshi Isozaki, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 16/277,099

(22) Filed: Feb. 15, 2019

(65) Prior Publication Data

US 2019/0267877 A1 Aug. 29, 2019

(30) Foreign Application Priority Data

Feb. 23, 2018 (JP) .............................. JP2018-031096

(51) Int. Cl.
*H02K 15/04* (2006.01)
*H02K 15/06* (2006.01)
*B23P 19/04* (2006.01)

(52) U.S. Cl.
CPC .......... *H02K 15/0485* (2013.01); *B23P 19/04* (2013.01); *H02K 15/0421* (2013.01); *H02K 15/064* (2013.01)

(58) Field of Classification Search
CPC ........... H02K 15/0485; H02K 15/0421; H02K 15/064; B23P 19/04
See application file for complete search history.

(56) References Cited

U.S. PATENT DOCUMENTS

2014/0333172 A1* 11/2014 Onishi .............. H02K 15/0485
310/208
2018/0233995 A1* 8/2018 Okuda ................ H01R 43/205

FOREIGN PATENT DOCUMENTS

JP 2018133862 A * 8/2018 ......... H02K 15/0421
WO 2014/010642 1/2014

* cited by examiner

*Primary Examiner* — Bayan Salone
(74) *Attorney, Agent, or Firm* — Rankin, Hill & Clark LLP

(57) ABSTRACT

An assembling device (10) includes a first arranging section (11), a second arranging section (12), eighteen support arms (13) for supporting coil segments (4), a feeding part (14), and a controller (16). When the controller (16) drives a motor (35) to rotate the feeding part (14) in a counterclockwise direction D1, a pressing roller (14c) rolls in the direction D1 along a first guide portion (11a), and presses a base part (21) of the eighteenth support arm (13) in the direction D1. Thus, the first to eighteenth support arms (13) are rotated in the direction D1 to insert the base parts (21) of the first to eighteenth support arms (13) sequentially in a second guide portion (12a) of the second arranging section (12), so that the first to eighteenth support arms (13) are rotated in a clockwise direction D2 to assemble the coil segments (4) while overlapping with one another.

8 Claims, 16 Drawing Sheets

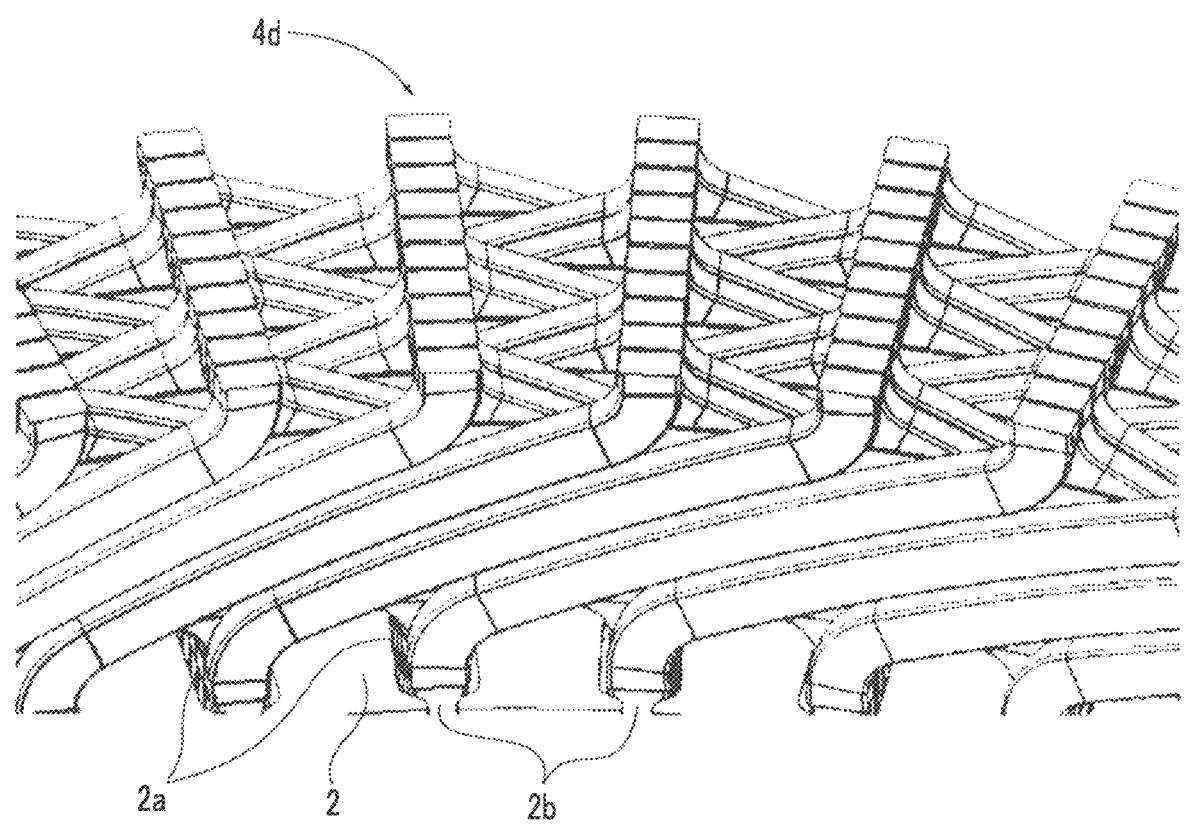

ASSEMBLING DEVICE AND METHOD

BACKGROUND OF THE INVENTION

Field of the Invention

The present invention relates to an assembling device for assembling object members and a method of assembling the object members.

Description of the Related Art

A rotating electric machine such as an electric motor or an electric generator includes a stator formed in a cylindrical shape, and a rotor rotatably disposed inside the stator. After the legs of each coil segment (electrical conductor) formed in a U-shape are inserted into the slots provided on a stator core of the stator, projecting portions are bent and welded in a circumferential direction, and a coil is thereby formed.

In an electrical conductor aligning device and an aligning method disclosed in International Publication No. WO 2014/010642, the aligning device includes a plurality of holding sections that hold one leg of each of a plurality of electrical conductors formed in a U-shape, and a moving part that causes the plurality of holding sections to move in a radial direction, and the plurality of electrical conductors are aligned in an annular shape while overlapping in the circumferential direction, by causing the holding sections holding one leg of each of the electrical conductors to move to an inner side in the radial direction by way of the moving part when the plurality of electrical conductors are to be aligned.

However, in an electrical conductor aligning device and an aligning method disclosed in International Publication No. WO 2014/010642, the moving part that causes the holding sections holding one leg of each of the electrical conductors to move is required, and thereby the device becomes complicated.

The present invention has been made in view of the above-described circumstances, and an object of the present invention is to provide an assembling device for assembling a plurality of object members and a method of assembling the object members by a simple structure.

SUMMARY OF THE INVENTION

An assembling device of the present invention is an assembling device for assembling a plurality of object members, the object members each including two legs and a connecting portion connecting the two legs, the assembling device including: a plurality of support arms, the support arms each including a support portion for supporting the leg of the object member and a base part spaced apart from the support portion; a guide portion that guides the base part; and a moving part that causes the base part of each of the plurality of support arms to move along a shape of the guide portion, in which the guide portion includes: a first guide portion that is formed in a first arc shape, the first guide portion allowing the base part of each of the plurality of support arms to be movable in a circumferential direction of the first arc in a state in which the support portion is located outside of the base part in a radial direction of the first arc; and a second guide portion that is formed in a second arc shape having a center of curvature that is located on an opposite side of the guide portion from a center of curvature of the first arc, the second guide portion being connected to the first guide portion to moveably guide the base part of each of the plurality of support arms in a circumferential direction of the second arc.

In the present invention, the first guide portion guides the base part of each of the plurality of support arms in a state in which the support portion is located outside of the base part, and the second guide portion guides the base part of each of the plurality of support arms in a state in which the support portion is located inside of the base part. Accordingly, in the first guide portion, when the base part of the support arm is moved by a predetermined length, a movement length of the support portion located outside of the base part is longer than the predetermined length. In contrast, in the second guide portion, when the base part of the support arm is moved by the predetermined length, a movement length of the support portion located inside of the base part is shorter than the predetermined length. Therefore, when the plurality of support arms are moved from the first guide portion to the second guide portion, a distance between the support portions of the support arms adjacent to each other becomes narrower.

According to the present invention, since the support portion supports the leg of the object member, a distance between the legs of the object members adjacent to each other can also be made narrower by reducing the distance between the support portions of the support arms adjacent to each other. Thus, the plurality of object members guided in the second guide portion can be assembled in a smaller range as compared with a case where the plurality of object members are guided in the first guide portion.

When a radius of curvature of the second guide portion is changed, the distance between the support portions of the support arms adjacent to each other changes after the support arms are moved from the first guide portion to the second guide portion. Accordingly, when the radius of curvature of the second guide portion is changed, the plurality of object members can be assembled in a desired range, and for example, the plurality of object members can be assembled so that the connecting portions of the plurality of object members overlap with one another.

Furthermore, it is preferable that the first guide portion and the second guide portion are formed from a groove, and the base part is formed from a roller which rolls through the groove.

According to this configuration, the friction at the time of movement of the support arms is smaller as compared with a case where the base part is formed from a non-rotatable shaft and therefore the looseness can be suppressed.

It is preferable that the support arm includes a roller connecting portion that is connected to the roller of the adjacent support arm.

According to this configuration, the support arms can be moved in a state in which the support arms adjacent to each other are connected to one another, and therefore the misalignment of the plurality of support arms when being assembled can be suppressed.

Furthermore, it is preferable that a clamping section that clamps the support arms in an up-down direction is provided.

According to this configuration, the misalignment of the support arms in the up-down direction can be suppressed.

It is preferable that the support portion includes a first support portion for supporting one of the two legs and a second support portion for supporting the other of the two legs.

According to this configuration, both of the two legs of the object member are supported, and therefore the object member can be stably and securely supported.

Furthermore, it is preferable that an anti-extraction mechanism that prevents the leg from being extracted from the support portion is provided.

According to this configuration, the leg of the object member can be prevented from being extracted from the support portion.

It is preferable that the support portion includes a first support portion for supporting one of the two legs and a second support portion for supporting the other of the two legs, the anti-extraction mechanism is provided between the first support portion and the second support portion, and comprises an anti-extraction plate disposed between one of the legs and the other of the legs.

According to this configuration, the leg of the object member can be prevented from being extracted from the support portion by a simple structure.

Furthermore, it is preferable that a positioning portion that positions the support portion of each of the plurality of support arms at a predetermined position is provided.

According to this configuration, the support portion of the support arm can be positioned at the predetermined position, and therefore the object member can be also positioned at the predetermined position.

An assembling method of the present invention is an assembling method of assembling a plurality of object members, the object members each including two legs and a connecting portion connecting the two legs, the assembling method including: a supporting step of supporting the object members by a plurality of support arms, the support arms each including a support portion for supporting the leg of the object member and a base part spaced apart from the support portion, an arranging step of arranging the plurality of support arms by a first guide portion, the first guide portion being provided in a guide portion for guiding the base part, being formed in a first arc shape, and guiding the base part of each of the plurality of support arms to be movable in a circumferential direction of the first arc in a state in which the support portion is located outside of the base part in the radial direction of the first arc; and an assembling step of assembling the plurality of support arms to assemble the plurality of object members by moving the base part of each of the plurality of support arms to a second guide portion, the second guide portion being provided in the guide portion, being formed in a second arc shape having a center of curvature that is located on an opposite side of the guide portion from a center of curvature of the first arc, and being connected to the first guide portion to guide the base part of each of the plurality of support arms to be movable in a circumferential direction of the second arc.

According to the present invention, in the arranging step, the first guide portion guides the base part of each of the plurality of support arms in a state in which the support portion is located outside of the base part, and in the assembling step, the second guide portion guides the base part of each of the plurality of support arms in a state in which the support portion is located inside of the base part. Accordingly, when the plurality of support arms are moved from the first guide portion to the second guide portion in the assembling step, a distance between the support portions of the support arms adjacent to each other can be made narrower. Since the support portion supports the leg of the object member, a distance between the legs of the object members adjacent to each other can also be made narrower by reducing the distance between the support portions of the support arms adjacent to each other. Thus, the plurality of object members can be assembled in a smaller range.

BRIEF DESCRIPTION OF THE DRAWINGS

FIG. 4A is a perspective view illustrating a projecting portion of the coil segment;

DETAILED DESCRIPTION OF THE PREFERRED EMBODIMENTS

Hereinafter, embodiments of the present invention will be described with reference to the drawings.

First, an example of a structure of a rotating electric machine will be described.

Figure 1:
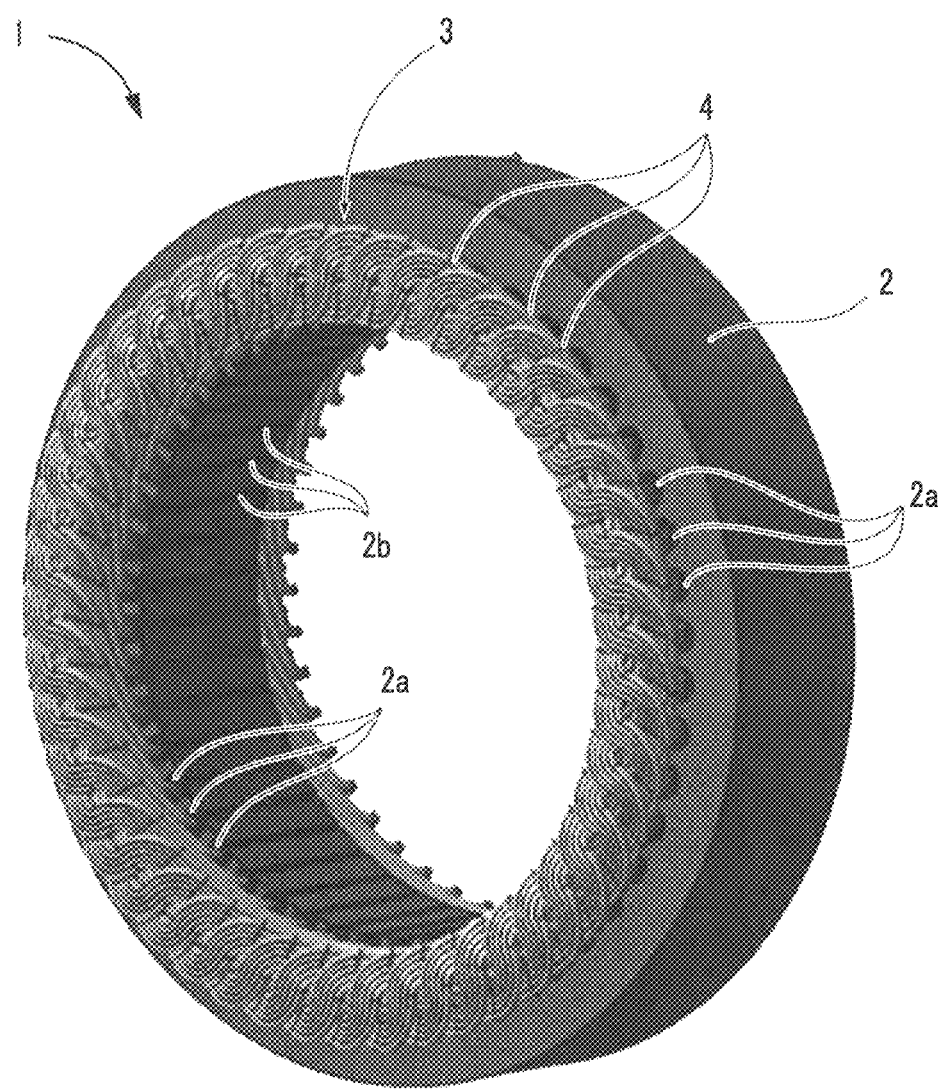
FIG. 1 is a perspective view illustrating a stator of a rotating electric machine into which coil segments assembled by an assembling device of the present invention are inserted.
Figure 2:
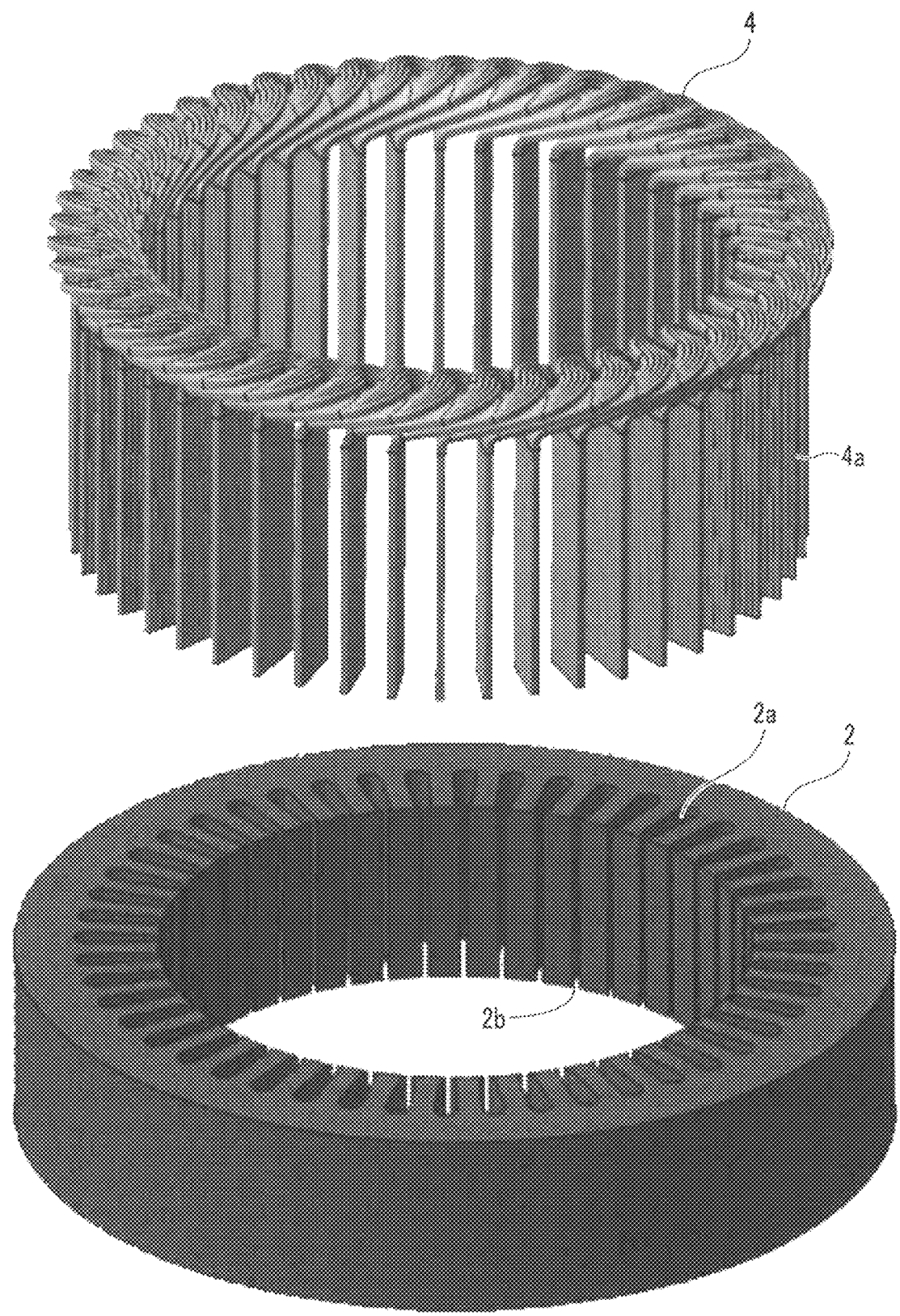
FIG. 2 is a perspective view illustrating a stator core and a coil segment.

As illustrated in FIG. 1 and FIG. 2, the rotating electric machine such as an electric motor or an electric generator includes a stator 1 formed in a cylindrical shape, and a rotor (not illustrated) rotatably disposed on the inner side of the stator 1.

The stator 1 includes a stator core 2 and a coil 3. The stator core 2 has a cylindrical shape, and has a plurality of slots 2a which penetrate in the direction of a rotation axis, the slots 2a being spaced apart in a circumferential direction. The slots 2a are formed such that the shapes of the cross sections thereof in the radial direction of the stator core 2 radially elongate from the center side of the stator core 2 in the radial direction, and are in communication with the inner peripheral surface of the stator core 2 through slits 2b formed in the stator core 2.

Figure 3:
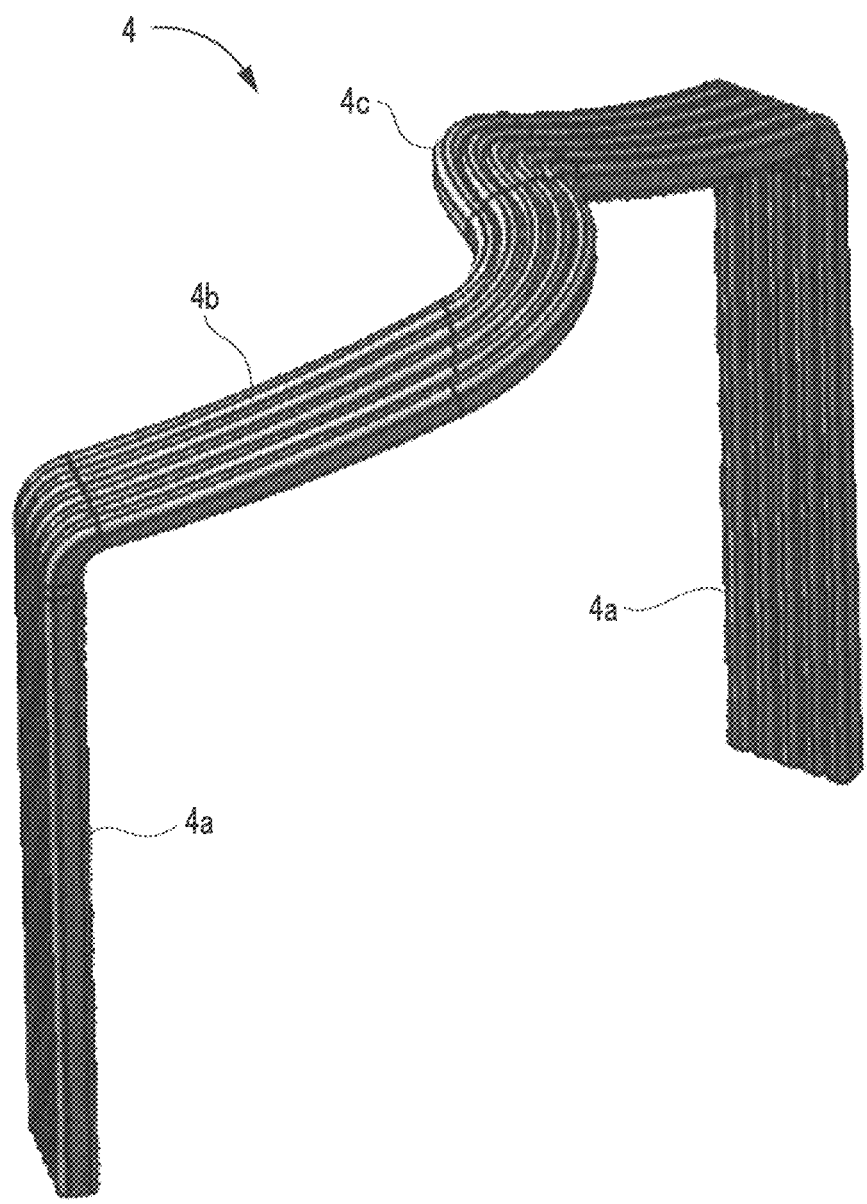
FIG. 3 is a perspective view illustrating the coil segment.

The coil 3 is formed by inserting coil segments 4, one of which is illustrated in FIG. 3, into the slots 2a from one side and by twisting and bending in the circumferential direction the projecting portions thereof that project from the other side of the slots 2a and then welding the projecting portions.

Each of the coil segments 4 is formed by bundling a plurality of (four in the present embodiment) conductors having rectangular cross sections (rectangular conducting wires) by arranging the conductors side by side such that wide surfaces thereof face each other and then forming the bundle into a U-shape. The coil segment 4 is made up of a pair of legs 4a, 4a and a head 4b (connecting portion) that connects one ends (the upper ends in the figure) of the two legs 4a, 4a.

Note that the coil segment 4 may be any bundle of a plurality of rectangular wires aligned in the width direction, for example, a plurality of rectangular wires bundled side by side such that the narrow surfaces thereof face each other.

At the center of the head 4b, an S-shaped portion 4c, which curves in an S-shape in the lengthwise direction of the rectangular wires, is formed. Furthermore, the head 4b slopes downward from the center thereof (the center of the S-shaped portion 4c) toward the two legs 4a, 4a. The leg 4a of the coil segment 4 is inserted into the corresponding slot 2a from one side thereof. The leg 4a of the coil segment 4 projects from the other side of the slot 2a.

A projecting portion 4d of the leg 4a, which projects from the other side of the slot 2a is bent in the circumferential direction of the stator core 2 by a bending device (not illustrated), as illustrated in FIG. 4A, and distal end portions 4e of matching projecting portions 4d are welded by a welding device (not illustrated). Thus, eight layers (eight pieces) of coil segments 4 are laminated in the radial direction to complete the stator 1. In this case, the layers are arranged in order, beginning with a first layer, a second layer, . . . , an eighth layer, from the radially inner side to the radially outer side.

Figure 4B:
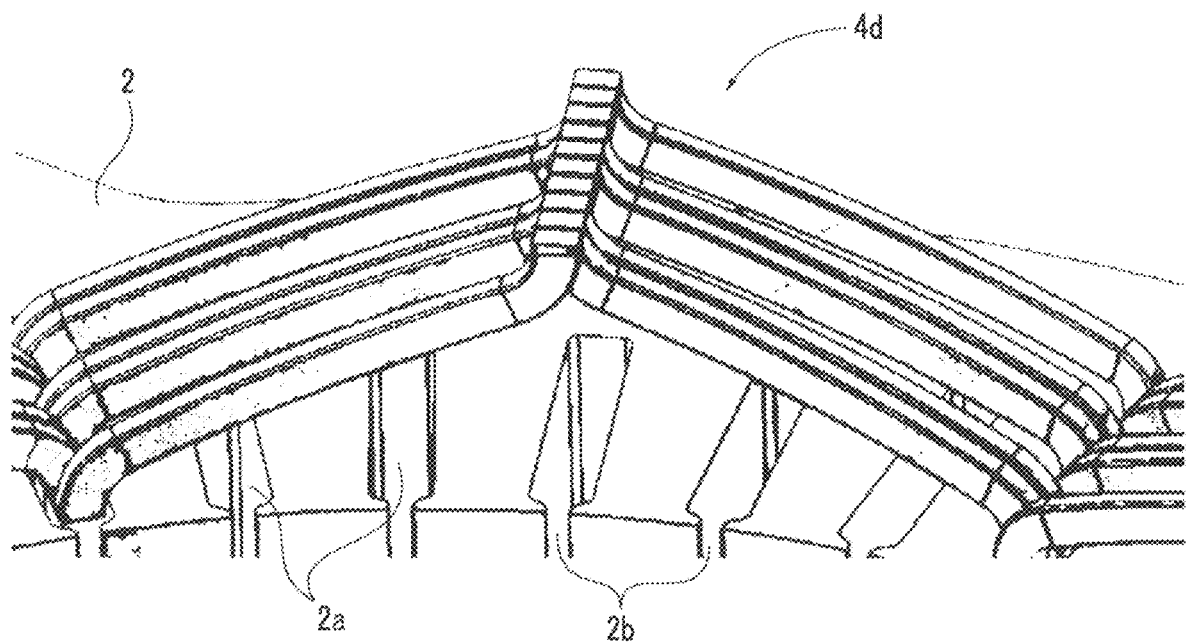
FIG. 4B is a perspective view illustrating a projecting portion of the coil segment.

Note that the coil 3 in the present embodiment is a three-phase coil consisting of a U-phase, a V-phase, and a W-phase. The legs 4a of the coil segments 4 inserted into each of the slots 2a are arranged in the order of the U-phase, the U-phase, the V-phase, the V-phase, the W-phase and the W-phase in the circumferential direction. FIG. 4B illustrates only the coil for one phase (e.g., the U-phase coil) of the three phases.

[Assembling Device]

Figure 5:
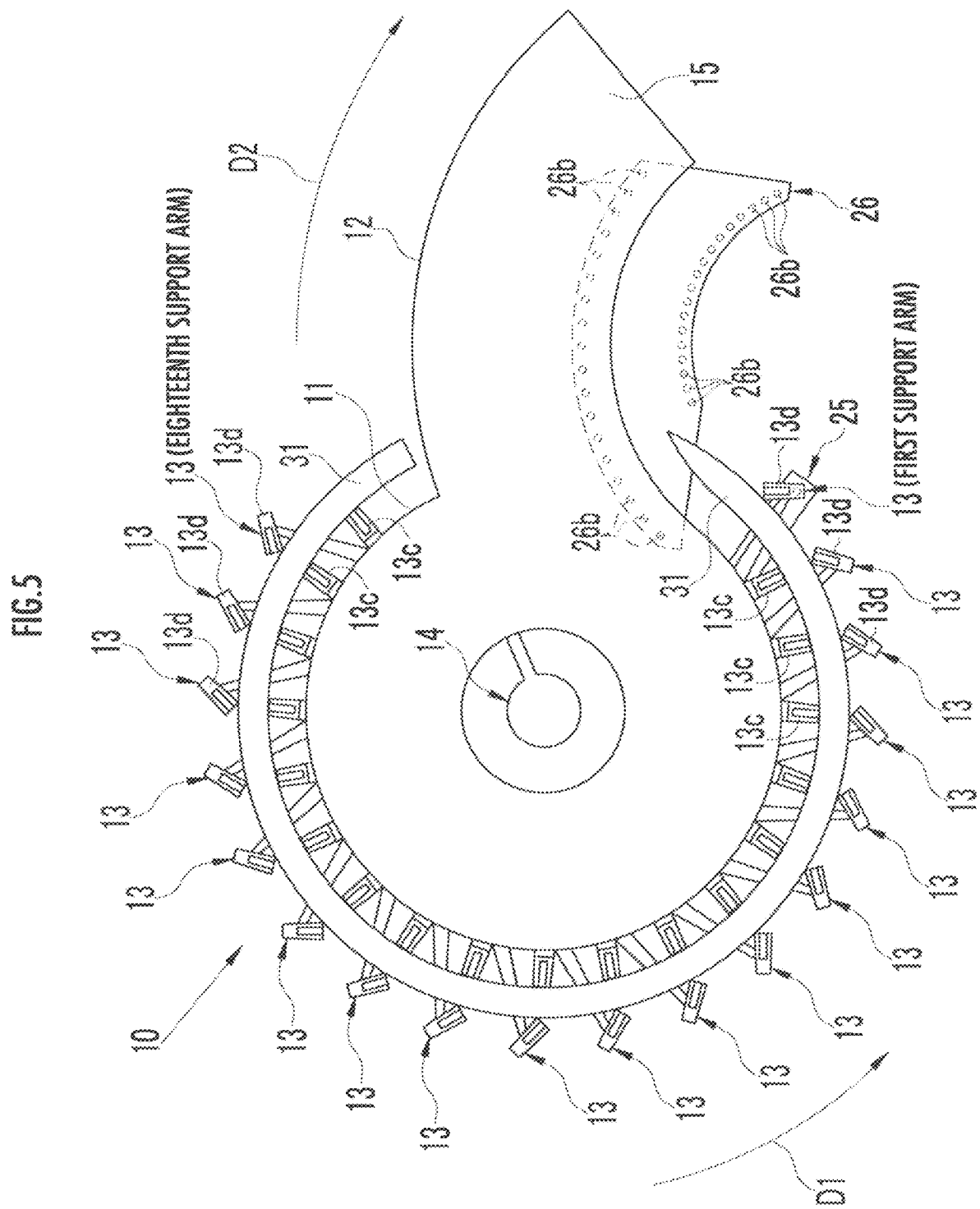
FIG. 5 is a top view illustrating an assembling device in a state in which support arms are guided by a first guide portion.
Figure 6:
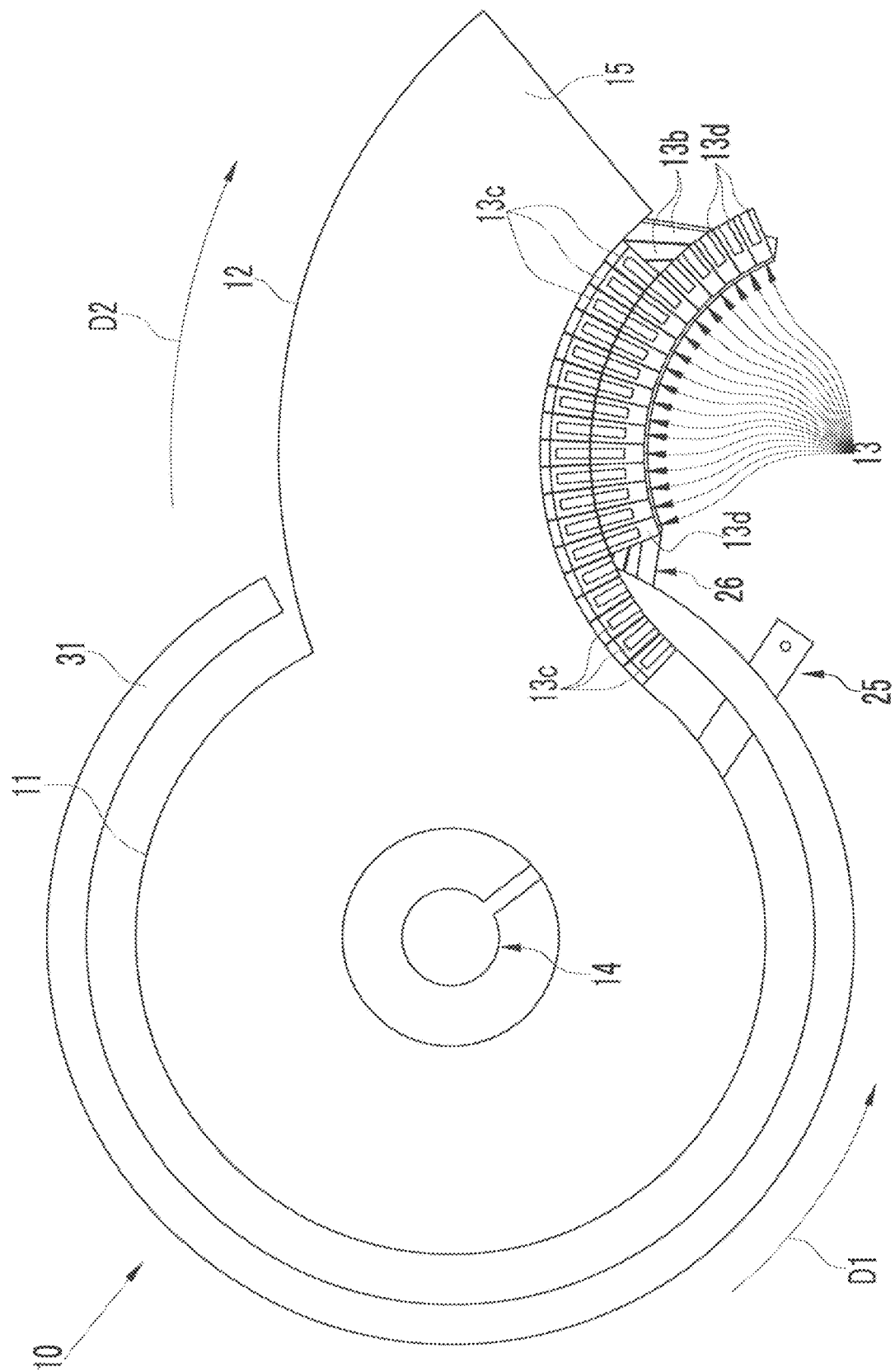
FIG. 6 is a top view illustrating the assembling device in a state in which the support arms are guided by a second guide portion.

The following will describe an assembling device 10 for assembling the plurality (e.g., eighteen pieces) of coil segments 4 with reference to FIG. 5 and FIG. 6.

The assembling device 10 includes a first arranging section 11 having an arc-shaped outer peripheral portion, a second arranging section 12 having an arc-shaped outer peripheral portion, and eighteen support arms 13 that are arranged by the first arranging section 11 and the second arranging section 12. The first arranging section 11 and the second arranging section 12 are attached to a base (not illustrated). The eighteen support arms 13 support the coil segments 4, respectively.

The first arranging section 11 arranges the eighteen support arms 13 to form a fan-shape (see FIG. 5), and the second arranging section 12 arranges to assemble the eighteen support arms (see FIG. 6). Note that in the present embodiment, the first arranging section 11 and the second arranging section 12 are integrally formed, but may be separately provided.

Figure 14:
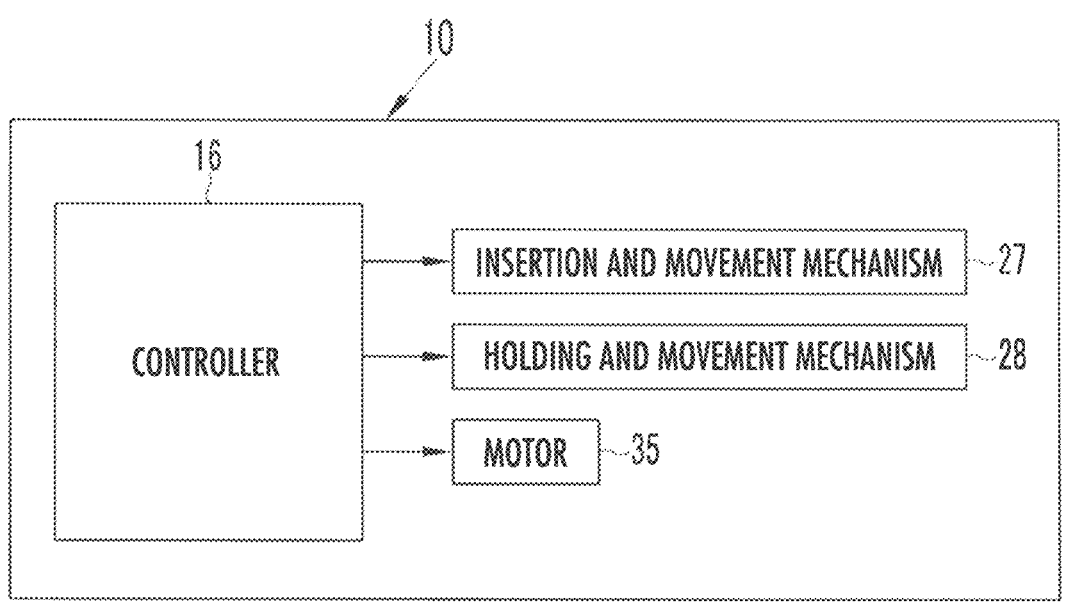
FIG. 14 is a block diagram illustrating an electrical configuration of the assembling device.

The assembling device 10 includes a feeding part 14 that feeds the support arms 13 in a counterclockwise direction D1 in the first arranging section 11, a top cover 15 that covers the tops of the first arranging section 11 and the second arranging section 12, and a controller 16 (see FIG. 14). The controller 16 includes, for example, a CPU, and centrally controls the assembling device 10. When the top cover 15 is attached, the support arms 13 are held between the first arranging section 11 and the top cover 15 and between the second arranging section 12 and the top cover 15. This enables looseness in the up-down direction of the support arms 13 to be suppressed. In the present embodiment, a clamping section that clamps the support arms 13 in the up-down direction includes the first arranging section 11 and the second arranging section 12, and the top cover 15.

In the present embodiment, the support arm 13 that is located closest to the counterclockwise direction D1 side in FIG. 5 of the eighteen support arms 13 is referred to as a first support arm 13, a support arm 13 that is linked to the first support arm 13 on a clockwise direction D2 side of the first support arm 13 is referred to as a second support arm 13, and the support arm 13 that is located closest to the clockwise direction D2 side in FIG. 5 is referred to as a eighteenth support arm 13.

Figure 7:
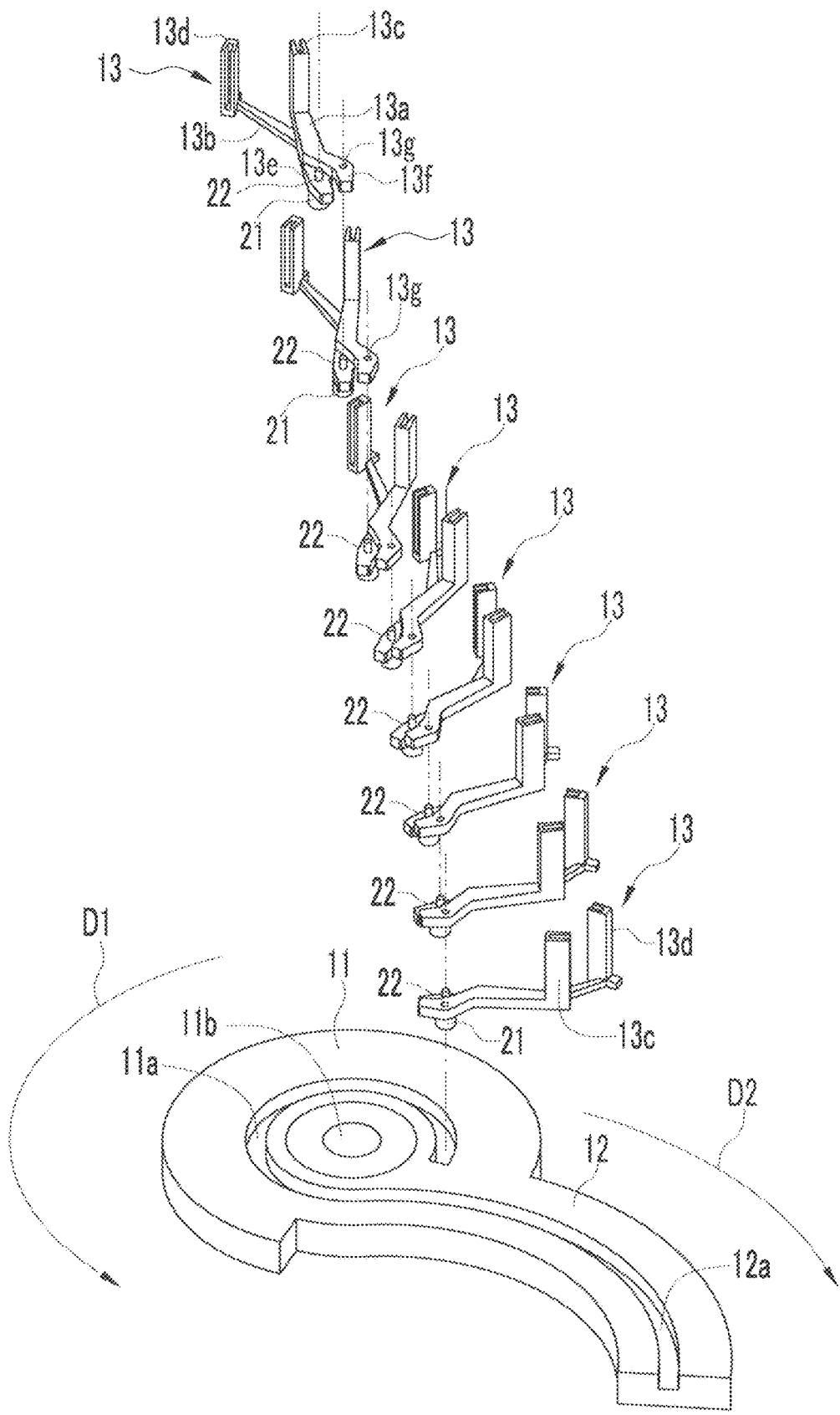
FIG. 7 is a perspective view illustrating a state in which the assembling device is disassembled.
Figure 8:
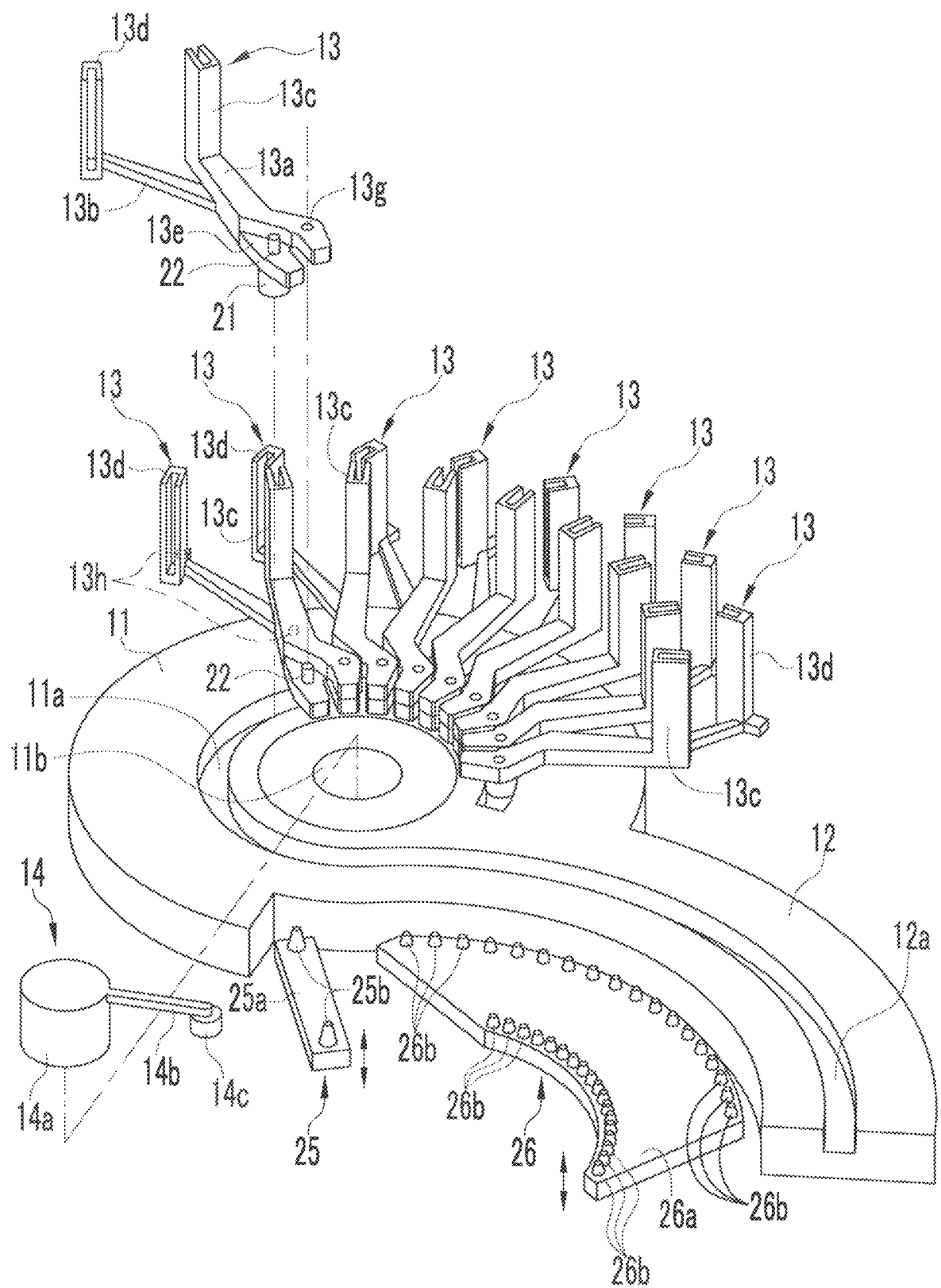
FIG. 8 is a perspective view illustrating a state in which the assembling device is disassembled.

As illustrated in FIG. 7 and FIG. 8, the first arranging section 11 has a first guide portion 11a formed therein, the first guide portion 11a being an arc-shaped groove that rotatably guides the support arms 13 in the counterclockwise direction D1 with a circle center of the first arranging section 11 being a rotational center. The first arranging section 11 has an opening 11b formed for inserting a main body 14a of the feeding part 14 thereinto. The first guide portion 11a is formed in a first arc shape, and allows a base part 21 of the support arm 13 to be movable in the circumferential direction of the first arc in a state in which first and second holders 13c, 13d of the support arm 13 are located outside of the base part 21 in the radial direction of the first arc.

The second arranging section 12 has an arc-shaped second guide portion 12a formed therein, the second guide portion 12a rotatably guiding the support arms 13 in the clockwise direction D2 with a circle center of the second arranging section 12 being a rotational center. The second guide portion 12a is formed continuously to the first guide portion 11a. The second guide portion 12a is formed in a second arc shape having a center of curvature that is located on the opposite side of a guide portion (the first guide portion 11a and the second guide portion 12a) from a center of curvature of the first guide portion 11a to guide the base part 21 of the support arm 13 to be movable in the circumferential direction of the second arc.

The support arm 13 includes a first arm portion 13a, and a second arm portion 13b which is connected to one end of the first arm portion 13a. The first arm portion 13a comprises a first holder 13c (a first support portion) formed thereon, the first holder 13c having a recess formed for inserting one of the legs 4a of the coil segment 4.

The second arm portion 13b comprises a second holder 13d (a second support portion) formed thereon, the second holder 13d having a recess formed for inserting the other leg 4a of the coil segment 4. Note that it is only required that at least one of the first holder 13c and the second holder 13d is formed.

The other end of the first arm portion 13a is provided with a first plate portion 13e and a second plate portion 13f. The first plate portion 13e is formed below the second plate portion 13f, and the first plate portion 13e and the second plate portion 13f are formed in a stepped shape.

The base part 21 having, for example, a roller shape, is attached to the bottom surface of the first plate portion 13e so as to be rotatable in the counterclockwise direction D1 and the clockwise direction D2. A link shaft 22 is uprightly formed from the top surface of the first plate portion 13e so as to be coaxial with the base part 21.

The second plate portion 13f has a link hole 13g formed for inserting the link shaft 22 provided on the first plate portion 13e of the adjacent support arm 13. When the link shaft 22 is inserted into the link hole 13g of the adjacent support arm 13, the support arms 13 adjacent to each other are linked to move together. In the present embodiment, the support arms 13 adjacent to each other of the eighteen support arms 13 are linked to each other. In the present embodiment, a roller connecting portion which is connected to the base part 21 (roller) of the adjacent support arm 13 includes the link shaft 22 and the link hole 13g.

FIG. 8 illustrates that the eleventh to eighteenth support arms 13 are set in a state in which the support arms 13 adjacent to each other are linked to each other, and the tenth support arm 13 is to be set so as to be linked to the eleventh support arm 13.

The feeding part 14 includes the main body 14a that is arranged to be rotatable about a rotation center coaxial to the rotation center of the first guide portion 11a of the first arranging section 11, an arm portion 14b extending in the radial direction of the first arranging section 11, and a pressing roller 14c. The pressing roller 14c is rotatably attached to the bottom surface of the distal end of the arm portion 14b. The main body 14a is rotated by a motor 35 (see FIG. 14). Driving of the motor 35 is controlled by the controller 16.

The main body 14a is rotatably inserted into the opening 11b of the first arranging section 11. The pressing roller 14c is inserted into the first guide portion 11a, and is guided by the first guide portion 11a.

Figure 9:
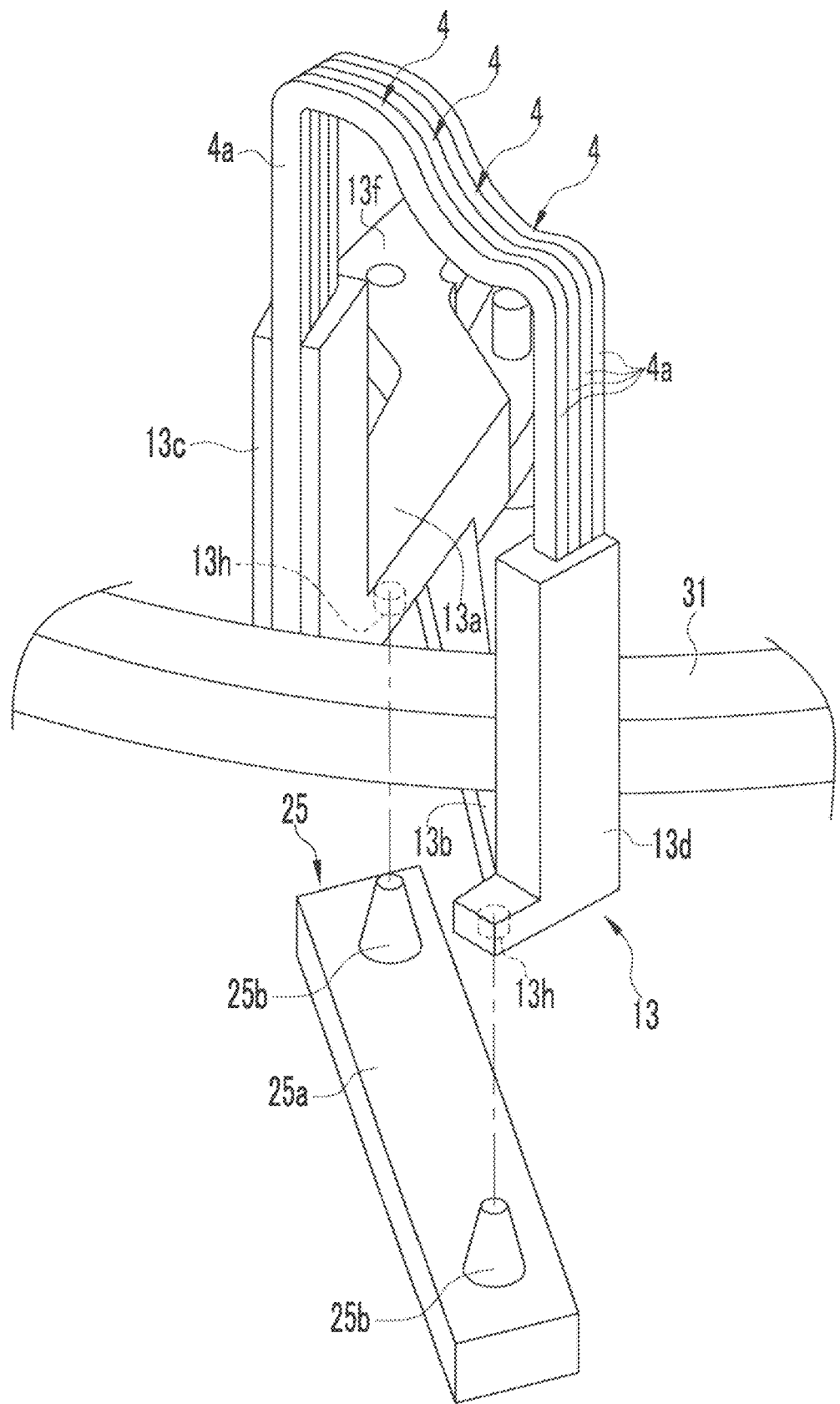
FIG. 9 is a perspective view illustrating the support arm, the coil segment, an anti-extraction plate, and an insertion position determining part.

As illustrated in FIG. 8 and FIG. 9, each of the first arm portion 13a and the second holder 13d has a position determining recess 13h formed in the bottom surface thereof.

The assembling device 10 includes an insertion position determining part 25 that positions one support arm 13 at an insertion position (the position where the first support arm 13 is disposed as illustrated in FIG. 5), and a holding position determining part 26 that positions the eighteen support arms 13 at holding positions (the positions at which the first to eighteenth support arms 13 are disposed as illustrated in FIG. 6). Note that the insertion position determining part 25 and the holding position determining part 26 are not illustrated in FIG. 7.

The insertion position determining part 25 includes an insertion position determining plate 25a, and two tapered insertion position determining pins 25b that are uprightly formed on the insertion position determining plate 25a. The insertion position determining part 25 is moved in the up-down direction by an insertion and movement mechanism 27 (see FIG. 14) having a motor, a gear, etc. The insertion position determining pins 25b are inserted into the respective position determining recesses 13h of the support arm 13 which is positioned at the insertion position.

Driving of the insertion and movement mechanism 27 is controlled by the controller 16. The controller 16 controls to move the insertion position determining part 25 to the lower position in a normal state so that the insertion position determining pins 25b are not inserted into the position determining recesses 13h. Note that the insertion position determining part 25 and the insertion and movement mechanism 27 may not be provided.

The holding position determining part 26 includes a holding position determining plate 26a, and thirty-six tapered holding position determining pins 26b that are uprightly formed on the holding position determining plate 26a. The holding position determining part 26 is moved in the up-down direction by a holding and movement mechanism 28 (see FIG. 14) having a motor, a gear, etc. The holding position determining pins 26b are inserted into the respective position determining recesses 13h of the eighteen support arms 13 when the eighteen support arms 13 are positioned at holding positions (see FIG. 6).

Driving of the holding and movement mechanism 28 is controlled by the controller 16. The controller 16 controls to move the holding position determining part 26 to the lower position in a normal state so that the holding position determining pins 26b are not inserted into the position determining recesses 13h. Note that the holding position determining part 26 and the holding and movement mechanism 28 may not be provided.

As illustrated in FIG. 9, the assembling device 10 comprises an anti-extraction plate 31 that prevents the leg 4a inserted into the first holder 13c and the leg 4a inserted into the second holder 13d from being extracted from the first holder 13c and the second holder 13d, respectively. The anti-extraction plate 31 is formed into an arc-shape in such a manner to pass between the first holder 13c and the second holder 13d. Note that the anti-extraction plate 31 is not illustrated in FIG. 8. Anything that can prevent two legs 4a from being extracted from the first holder 13c and the second holder 13d can be used instead of the anti-extraction plate 31. For example, a holding mechanism for holding the head 4b of the coil segment 4 may be arranged to prevent the two legs 4a from being extracted.

Even when the legs 4a that have been inserted into the first holder 13c and the second holder 13d, respectively, are moved in the radial direction of the first arranging section 11, the legs 4a are in contact with the anti-extraction plate 31. Thus, the legs 4a are prevented from being extracted from the first holder 13c and the second holder 13d. Note that the anti-extraction plate may not be provided.

Figure 10:
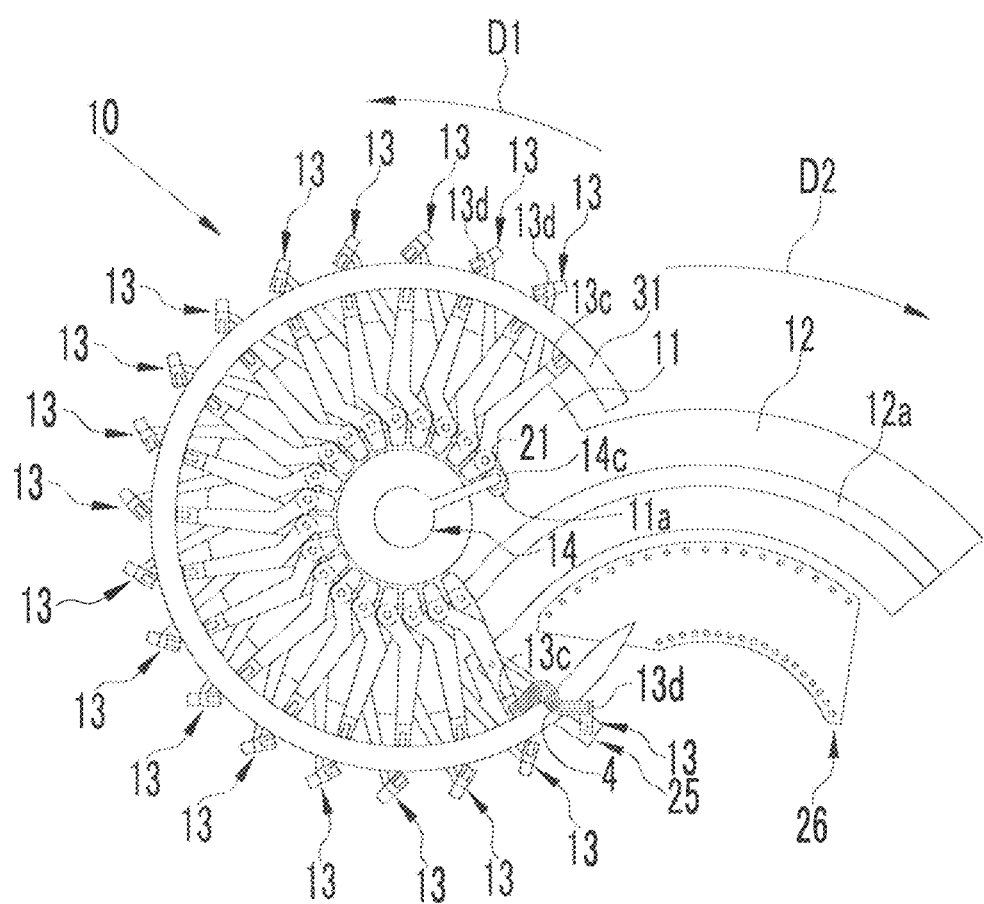
FIG. 10 is a top view illustrating the assembling device in a state in which the coil segment is supported by a first support arm.

In an initial state illustrated in FIG. 10, the first support arm 13 is positioned at an insertion position where the coil segment 4 conveyed by a coil segment conveyer (not illustrated) is to be inserted into the first support arm 13.

When the motor 35 is driven by the controller 16, and the main body 14a of the feeding part 14 is rotated in the counterclockwise direction D1, the pressing roller 14c rolls in the counterclockwise direction D1 along the first guide portion 11a of the first arranging section 11, and presses the base part 21 of the eighteenth support arm 13 in the counterclockwise direction D1.

When the base part 21 of the eighteenth support arm 13 is pressed in the counterclockwise direction D1, the base part 21 rolls in the counterclockwise direction D1 along the first guide portion 11a of the first arranging section 11, and the eighteenth support arm 13 rotates in the counterclockwise direction D1.

When the eighteenth support arm 13 rotates in the counterclockwise direction D1, the seventeenth support arm 13 linked to the eighteenth support arm 13 is also rotated in the counterclockwise direction D1. Similarly, the sixteenth to first support arms 13 are also rotated in the counterclockwise direction D1.

[Coil Segment Assembly]

When the plurality (eighteen pieces) of coil segments 4 are assembled at positions corresponding to the slots of the stator core 2, i.e. slots 2a, using the assembling device 10, firstly, the controller 16 sets the first support arm 13 so as to be positioned at the insertion position as illustrated in FIG. 9 and FIG. 10 (arranging step). Note that the top cover 15 is not illustrated in FIG. 10 to FIG. 13.

Next, the controller 16 drives the insertion and movement mechanism 27 to move the insertion position determining part 25 upward so that the insertion position determining pins 25b are inserted into the position determining recesses 13h of the support arm 13 (the first support arm 13) which is positioned at the insertion position (positioning control). Thus, the first support arm 13 can be positioned at the insertion position. The controller 16 maintains, for a predetermined time (e.g., one second), a positioning state in which the insertion position determining pins 25b are inserted into the position determining recesses 13h of the first support arm 13 which is positioned at the insertion position (maintaining control).

While the first support arm 13 is in the positioning state for one second, the coil segment conveyer conveys the coil segment 4, and the pair of legs 4a, 4a is inserted into the first holder 13c and the second holder 13d of the first support arm 13 (inserting control) (supporting step).

After the controller 16 maintains the positioning state for one second, the insertion and movement mechanism 27 is driven to move the insertion position determining part 25 downward so that the insertion position determining pins 25b are extracted from the position determining recesses 13h of the support arm 13 (the first support arm 13) which is positioned at the insertion position (extracting control).

Figure 11:
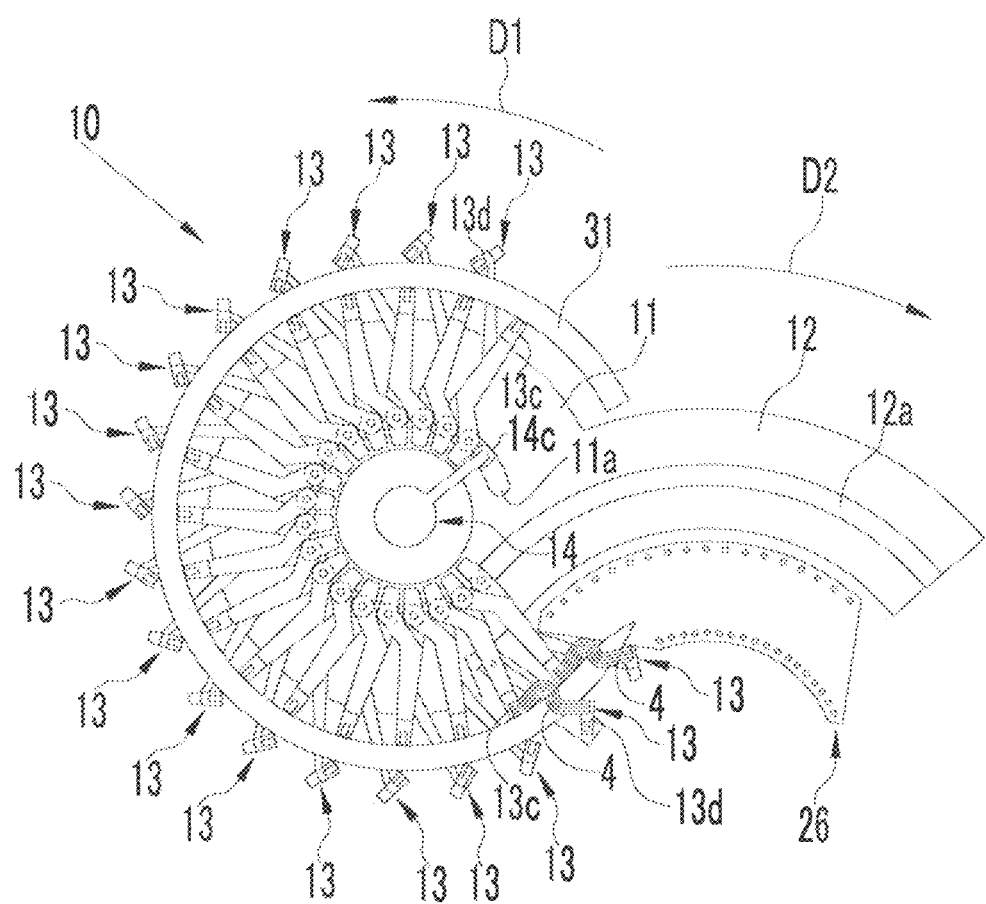
FIG. 11 is a top view illustrating the assembling device in a state in which the coil segment is supported by a second support arm.

Next, the controller 16 drives the motor 35 to rotate the feeding part 14 from a position illustrated in FIG. 10 to a position illustrated in FIG. 11 by a setting angle (e.g., 150) (rotating control). Thus, the second support arm 13 rotates to the insertion position.

Next, the controller 16 performs the above-described positioning control on the second support arm 13. Thus, the second support arm 13 can be positioned at the insertion position. Then, the above-described maintaining control is performed.

While the second support arm 13 is in the positioning state for one second, the coil segment conveyer performs the above-described inserting control on the second support arm 13.

Then, the controller 16 performs the above-described extracting control. Thus, the second support arm 13 can rotate.

Figure 12:
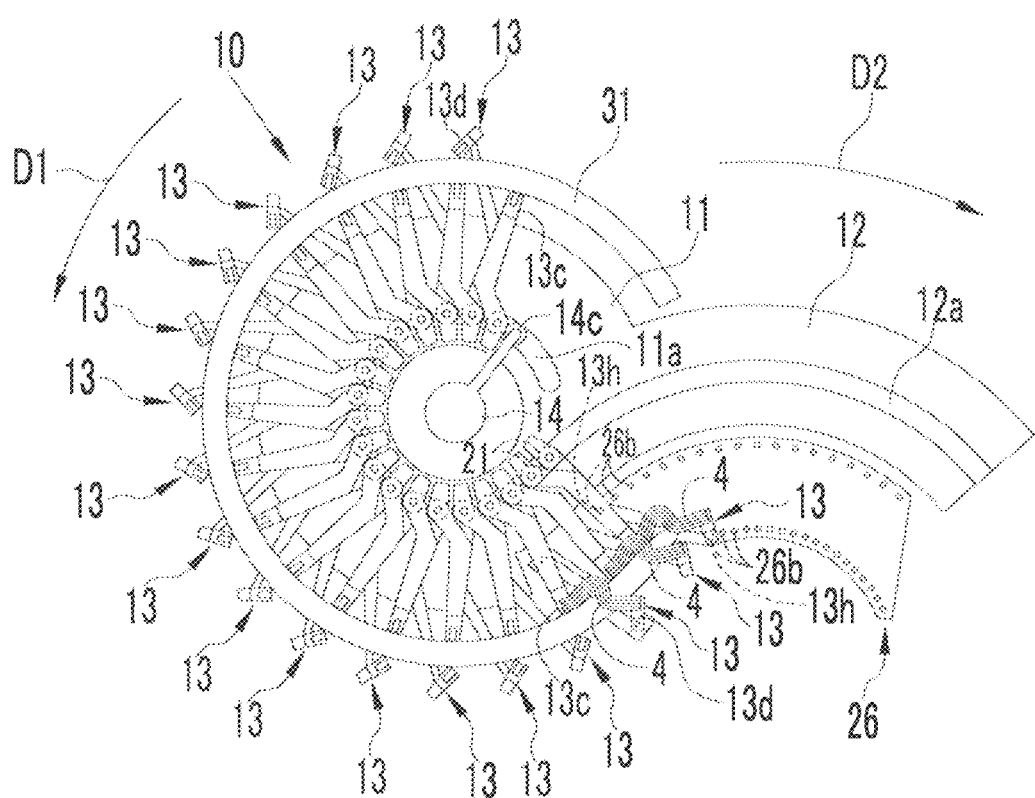
FIG. 12 is a top view illustrating the assembling device in a state in which the coil segment is supported by a third support arm.

Next, as illustrated in FIG. 12, the controller 16 performs the above-described rotating control, the above-described positioning control, the above-described maintaining control, and the above-described extracting control on the third support arm 13. While the above-described maintaining control is performed, the coil segment conveyer performs the above-described inserting control on the third support arm 13.

Figure 13:
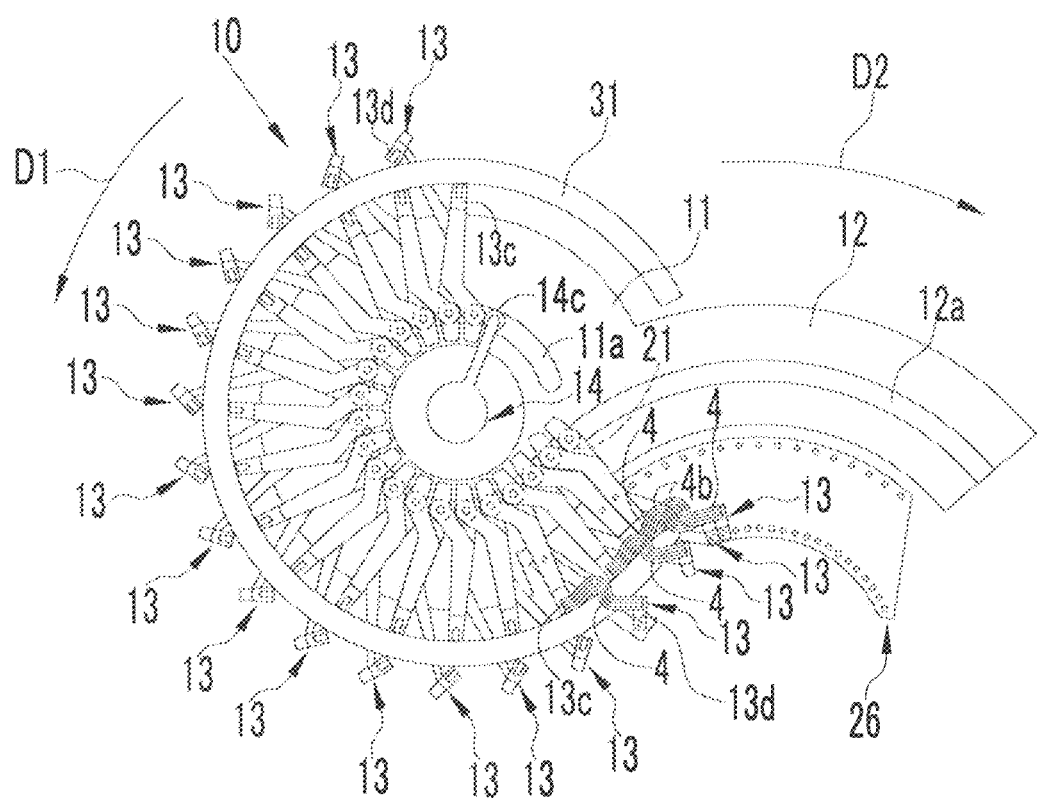
FIG. 13 is a top view illustrating the assembling device in a state in which the coil segment is supported by a fourth support arm.

Next, as illustrated in FIG. 13, the controller 16 performs the above-described rotating control, the above-described positioning control, the above-described maintaining control, and the above-described extracting control on the fourth support arm 13. While the above-described maintaining control is performed, the coil segment conveyer performs the above-described inserting control on the fourth support arm 13.

In the states illustrated in FIG. 12 and FIG. 13, the base parts 21 of the first support arm 13 and the second support arm 13 roll along the second guide portion 12a of the second arranging section 12, and thereby the first support arm 13 and the second support arm 13 rotate in the clockwise direction D2 (assembling step). In the present embodiment, a moving part that causes the base parts 21 of the respective first to eighteenth support arms 13 to move along the shapes of the first guide portion 11a and the second guide portion 12a includes the feeding part 14 and the motor 35.

In the states illustrated in FIG. 12 and FIG. 13, the first holder 13c and the second holder 13d are positioned inside the base part 21 in the radial direction of the second guide portion 12a. Accordingly, when the first support arm 13 and the second support arm 13 rotate in the clockwise direction D2, the first holder 13c and the second holder 13d of the first support arm 13 approach the first holder 13c and the second holder 13d of the second support arm 13.

In the state illustrated in FIG. 13, the head 4b of the coil segment 4 supported by the first support arm 13 overlaps with the head 4b of the coil segment 4 supported by the second support arm 13.

Figure 15:
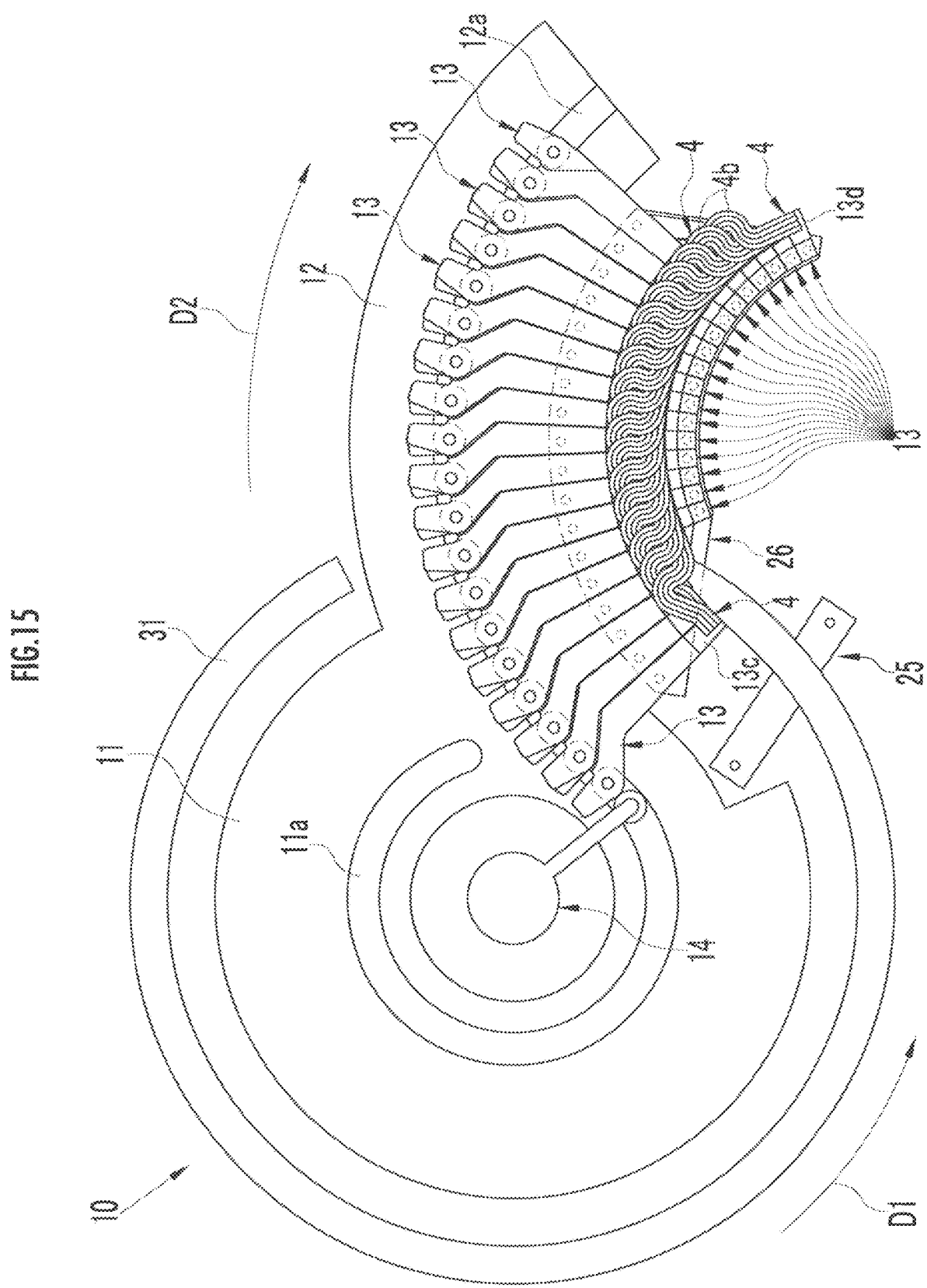
FIG. 15 is a top view illustrating the assembling device in a state in which the coil segments are assembled.

The controller 16 also performs the above-described rotating control, the above-described positioning control, the above-described maintaining control, and the above-described extracting control on the fifth to eighteenth support arms 13. The coil segment conveyer also performs the above-described inserting control on the fifth to eighteenth support arms 13. Thus, the coil segments 4 are supported by all of the first to eighteenth support arms 13. From this state, the controller 16 further drives the motor 35 to rotate the feeding part 14 by a setting angle (e.g., 30°). Thus, as illustrated in FIG. 15, the coil segments 4 supported by the respective first to eighteenth support arms 13 are assembled so as to overlap with one another.

Next, the controller 16 drives the holding and movement mechanism 28 to move the holding position determining part 26 upward so that the thirty-six holding position determining pins 26b are inserted into the thirty-six position determining recesses 13h in total that consist of two position determining recesses 13h formed in each of the first to eighteenth support arms 13. Thus, the first to eighteenth support arms 13 are positioned at the holding positions, and the coil segments 4 supported by the first to eighteenth support arms 13 are also positioned. The positions resulting from the positioning correspond to the respective slots 2a of the stator core 2.

A coil segment assembly device (not illustrated) holds and conveys the eighteen coil segments 4 that are assembled so as to overlap with one another, and inserts the legs 4a into the slots 2a of the stator core 2.

The eighteen coil segments 4 assembled by the assembling device 10 are positioned at positions corresponding to the respective slots 2a, and thereby the eighteen coil segments 4 can be securely inserted into the slots 2a.

Note that in the above-described embodiment, the base parts 21 are guided by the first guide portion 11a and the second guide portion 12a, but a structure in which a projecting portion is guided by a hole or a structure in which a hole or groove is guided by projecting portions (e.g., a rail and two rollers clamping the rail) may be employed.

In the above-described embodiment, the base parts 21 of the respective first to eighteenth support arms 13 are moved along the shapes of the first guide portion 11a and the second guide portion 12a by the feeding part 14 rotated by the motor 35, but the present invention is not limited thereto, and a structure for moving the base parts 21 can be appropriately changed. For example, the connecting portion which is connected to the first support arm 13 is moved along the shapes of the first guide portion 11a and the second guide portion 12a, so that the first to eighteenth support arms 13 can be pulled.

In the above-described embodiment, the support arms 13 adjacent to each other are linked to each other, but they may not be linked to each other.

In the above-described embodiment, the support arms 13 are held between the first arranging section 11 and the top cover 15 and between the second arranging section 12 and the top cover 15, but the support arms 13 may not be held.

In the above-described embodiment, the present invention is implemented with an assembling device for assembling the U-shaped coil segments 4 while overlapping with one another, but the present invention can be implemented on any assembling device for assembling object members having two legs and a connecting portion connecting the two legs. For example, the present invention may be implemented on an assembling device for assembling object members having an H-shape or a V-shape.

What is claimed is:

1. An assembling device for assembling a plurality of object members, the object members each including two legs and a connecting portion connecting the two legs, the assembling device comprising:
   a plurality of support arms, the support arms each including a support portion for supporting the two legs of one of the object members and a base part spaced apart from the support portion;
   a guide portion that guides the base part; and
   a moving part that causes the base part of each of the plurality of support arms to move along a shape of the guide portion,
   wherein the guide portion includes:
      a first guide portion that is formed in a first arc shape, the first guide portion allowing the base part of each of the plurality of support arms to be movable in a circumferential direction of the first arc in a state in which the support portion is located outside of the base part in a radial direction of the first arc, and
      a second guide portion that is formed in a second arc shape having a center of curvature that is located on an opposite side of the guide portion from a center of curvature of the first arc, the second guide portion being connected to the first guide portion to moveably guide the base part of each of the plurality of support arms in a circumferential direction of the second arc,
   wherein the first guide portion and the second guide portion are formed from a groove, and the base part is formed from a roller which rolls through the groove.

2. The assembling device according to claim 1, wherein the support arm includes a roller connecting portion that is connected to the roller of the adjacent support arm.

3. The assembling device according to claim 1, further comprising:
   a clamping section that clamps the support arms in an up-down direction.

4. The assembling device according to claim 1, wherein the support portion includes a first support portion for supporting one of the two legs and a second support portion for supporting the other of the two legs.

5. The assembling device according to claim 1, further comprising:
   an anti-extraction mechanism that prevents the two legs from being extracted from the support portion.

6. The assembling device according to claim 5, wherein the support portion includes a first support portion for supporting one of the two legs and a second support portion for supporting the other of the two legs, and
   the anti-extraction mechanism is provided between the first support portion and the second support portion, and comprises an anti-extraction plate disposed between one of the legs and the other of the legs.

7. The assembling device according to claim 1, further comprising:
   a positioning portion that positions the support portion of each of the plurality of support arms at a predetermined position.

8. An assembling method of assembling a plurality of object members, the object members each including two legs and a connecting portion connecting the two legs, the assembling method comprising:
   a supporting step of supporting the object members by a plurality of support arms, the support arms each including a support portion for supporting the two legs of one of the object members and a base part formed of a roller spaced apart from the support portion;
   an arranging step of arranging the plurality of support arms by a first guide portion formed of a groove through which the roller rolls, the first guide portion being provided in a guide portion for guiding the base part, being formed in a first arc shape, and guiding the base part of each of the plurality of support arms to be movable in a circumferential direction of the first arc in a state in which the support portion is located outside of the base part in a radial direction of the first arc; and
   an assembling step of assembling the plurality of support arms to assemble the plurality of object members by moving the base part of each of the plurality of support arms to a second guide portion formed of a groove through which the roller rolls, the second guide portion being provided in the guide portion, being formed in a second arc shape having a center of curvature that is located on an opposite side of the guide portion from a center of curvature of the first arc, and being connected to the first guide portion to guide the base part of each of the plurality of support arms to be movable in a circumferential direction of the second arc.

* * * * *